Patented July 15, 1930

1,770,395

UNITED STATES PATENT OFFICE

HARRY L. FREVERT, OF PHILADELPHIA, PENNSYLVANIA

PROCESS OF DESULPHURIZING FERROUS METAL

No Drawing.  Application filed February 21, 1928.  Serial No. 256,064.

This invention relates to the desulphurizing of ferrous metal, and particularly of cast iron, in a molten state. The object of the invention is to provide a desulphurizing agent that is both effective and economical.

Certain alkali or alkaline earth metals, or compounds thereof, possess theoretical efficiency, but they tend to produce a thick slag which prevents effective contact of the desulphurizing agent with the molten metal; or, unless in massive form, they are caught up by air currents and dissipate into the surrounding atmosphere. Both phenomena usually occur. Other known desulphurizing agents, particularly fluorspar, possess some practical efficiency, but I have discovered that either soda ash, alone, as an example of the first class of desulphurizing agents, or fluorspar, alone, is uncertain in its action, but that a combination of the two is both a certain and effective desulphurizer.

Soda ash, commercial sodium carbonate, a common and cheap material of the first class, possesses both the disadvantages to which I at first referred. If in powdered form, it largely is dissipated and such of it as remains may form a thick slag, with the result that its desulphurizing action is highly variable and uncertain.

I have discovered, however, that if to soda ash is added a proportion of a fluoride, such as fluorspar, the effect is to thin out and activate the slag, causing the mixture to come thoroughly into contact with the metal and effect the desired desulphurizing action. This action, I believe, is partly chemical and partly physical. Probably there is formed sodium fluoride, which is an excellent desulphurizing agent. Apparently, also, the sodium carbonate, as such, under these conditions, acts directly to desulphurize and is prevented from partly being dissipated and partly forming a thick slag.

To eliminate from 30 to 50 per cent. of the sulphur from a molten cast iron containing approximately 1 per cent. of sulphur, I have found it sufficient to add from 10 to 15 pounds of my preferred mixture per ton of metal to the metal while being tapped from the cupola.

The predominating ingredient of my composition is soda ash. The composition may comprise from about 4 per cent. to about 25 per cent. of fluorspar. I have found that about 10 per cent. is preferable. A smaller amount is permissible, but with a substantial reduction below 10 per cent. of fluorspar, the efficacy of the composition perceptibly diminishes. On the other hand, a substantially larger percentage adds little, if any, to the efficacy.

Instead of fluorspar (calcium fluoride, $CaF_2$), I may use other natural fluorides, such as, for illustration, cryolite (aluminum sodium fluoride, $3NaFAlF_3$), or an artificial fluoride such as barium fluoride ($BaF_2$), or a mixture of fluorides.

I am aware of the fact that it is known to add soda ash and fluorspar to metal in an open hearth furnace to which has previously been added lime to form a lime slag, the purpose of the addition being to "open" and thus thin out the lime slag. My invention does not contemplate the addition of a desulphurizing agent to the metal in an open hearth furnace, nor to a lime slag. My invention contemplates the addition of the desulphurizing agent to the molten metal in the absence of lime and while being tapped from and outside the furnace, as in a ladle while being tapped from a cupola, as hereinbefore specified.

Having now fully described my invention, what I claim and desire to protect by Letters Patent is:

The process of desulphurizing ferrous metal after it is melted in a furnace which comprises adding to the metal and bringing into intimate effective contact therewith outside the melting zone a desulphurizing agent comprising sodium carbonate in a major proportion and a fluoride in a minor proportion in the substantial absence of lime.

In testimony of which invention, I have hereunto set my hand, at Philadelphia, Pennsylvania, on this 15th day of February, 1928.

HARRY L. FREVERT.